July 14, 1970 R. W. WIEMANN 3,520,468
CONTAINER CLOSURE STACKING ALIGNMENT AND LATCHING STRUCTURE
Filed Jan. 3, 1969 5 Sheets-Sheet 2
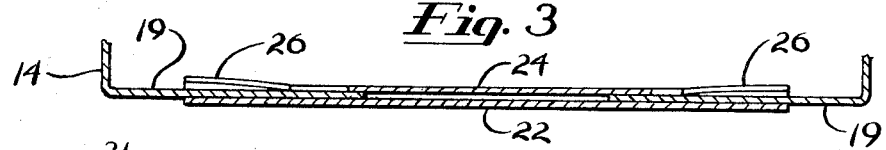
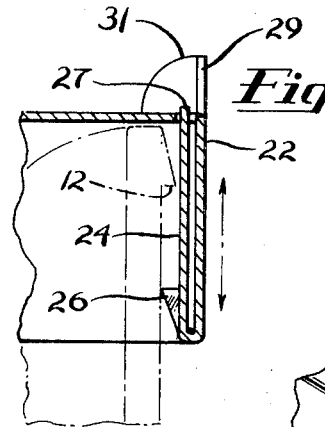
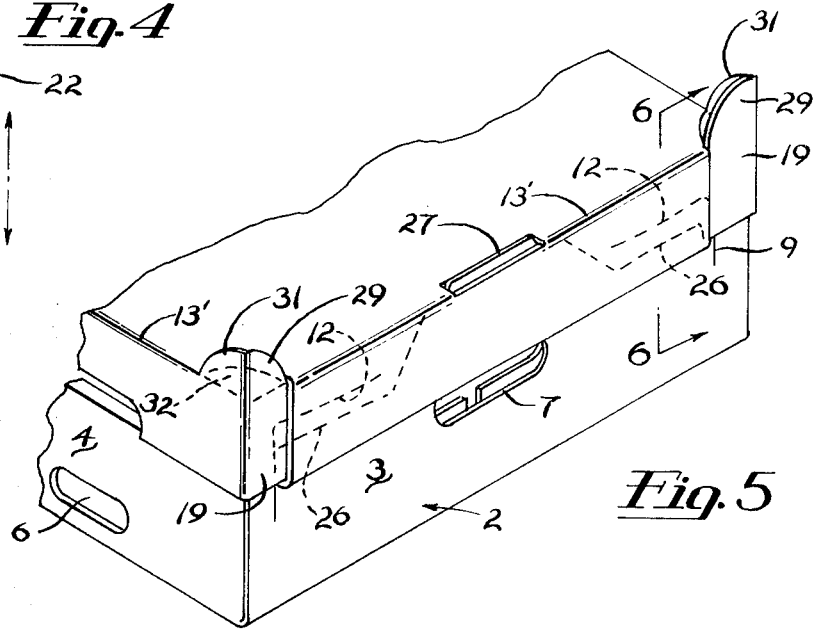
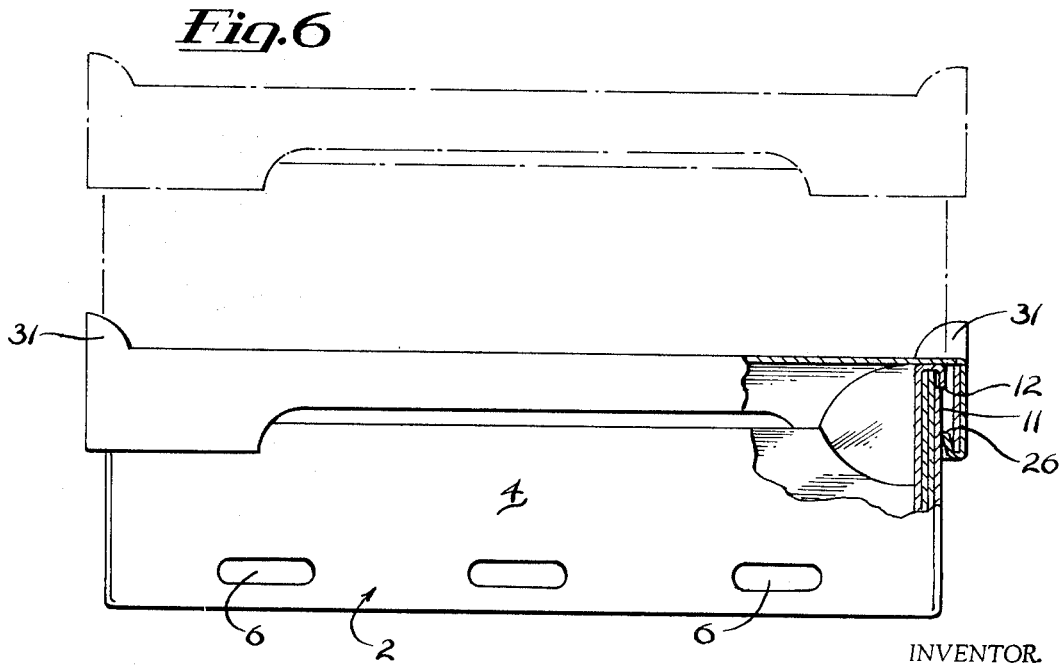
INVENTOR.
Ronald W. Wiemann
BY Stanley Bialos
Corwin R. Horton
William K. Quarles
Attorneys July 14, 1970          R. W. WIEMANN          3,520,468
CONTAINER CLOSURE STACKING ALIGNMENT AND LATCHING STRUCTURE
Filed Jan. 3, 1969          5 Sheets-Sheet 3
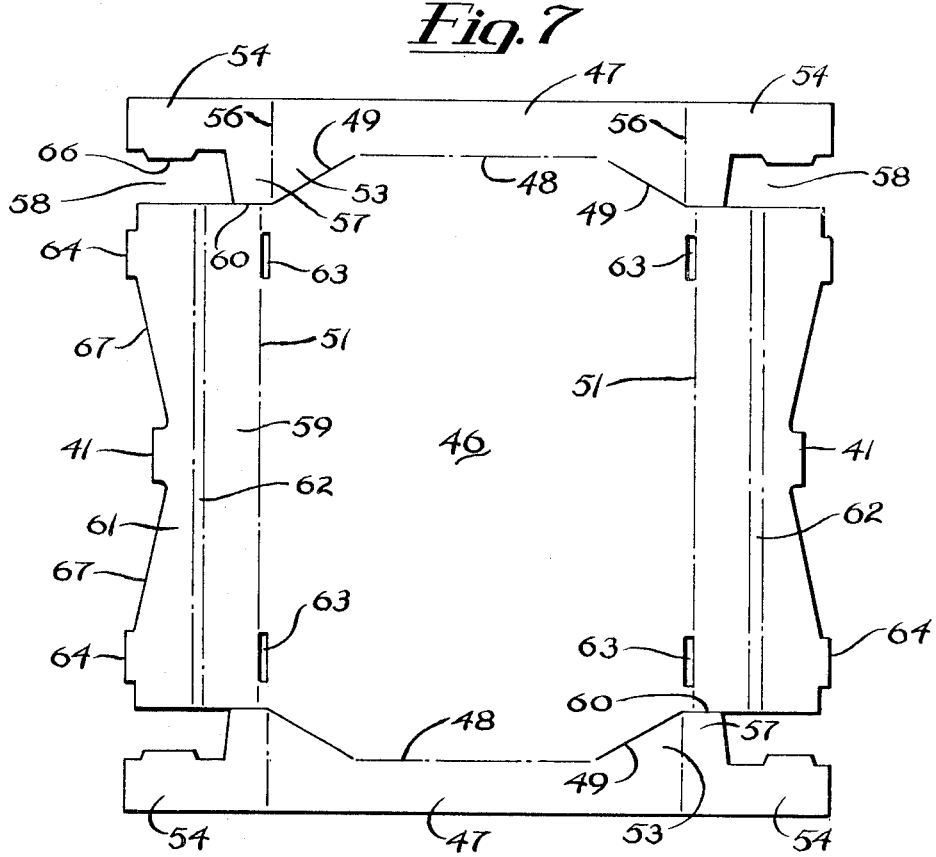
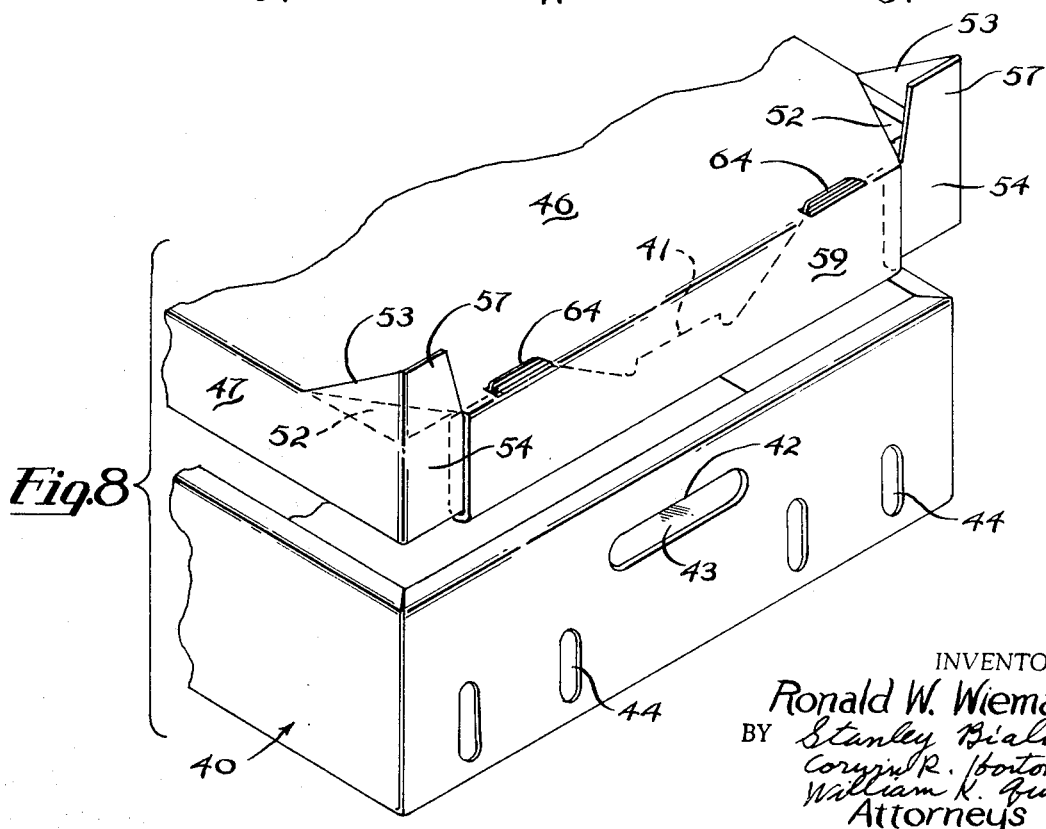
INVENTOR.
Ronald W. Wiemann
BY Stanley Bialos
Corwin R. Horton
William K. Quarles
Attorneys

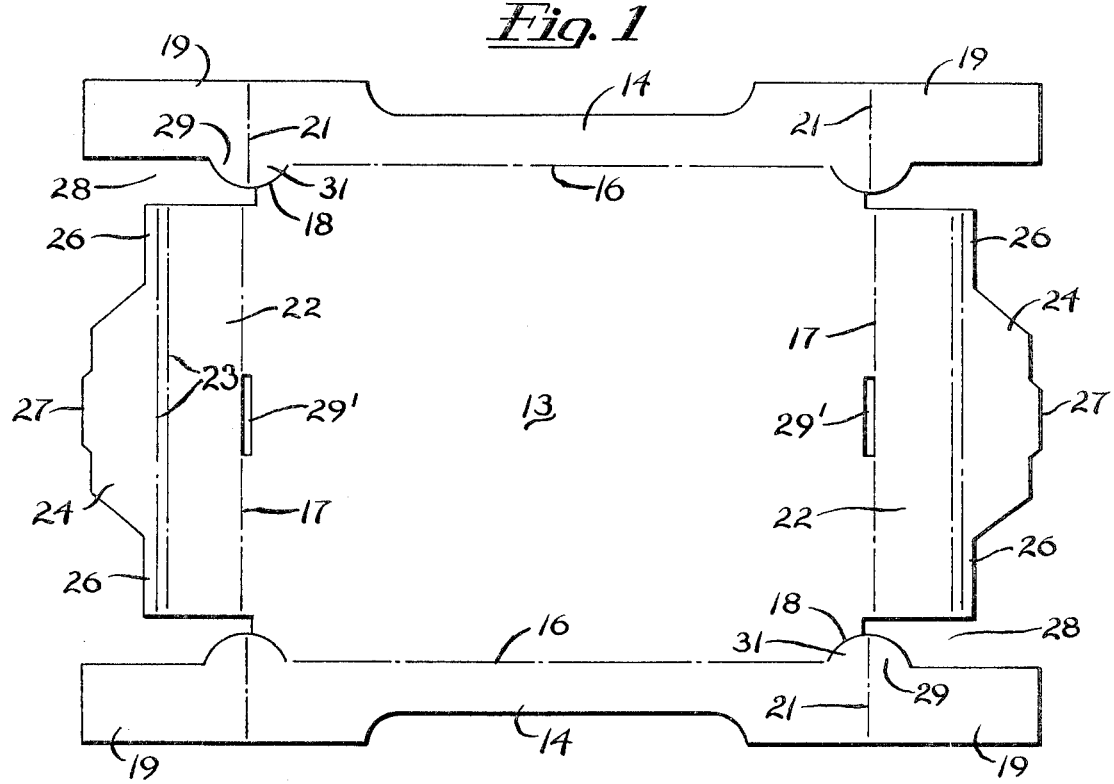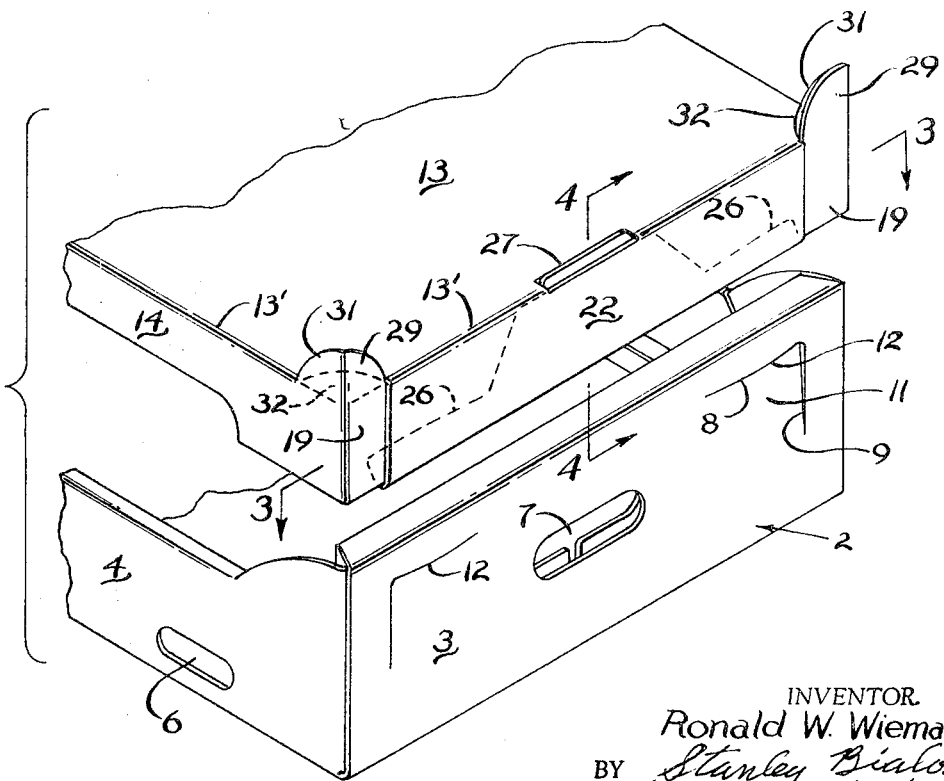

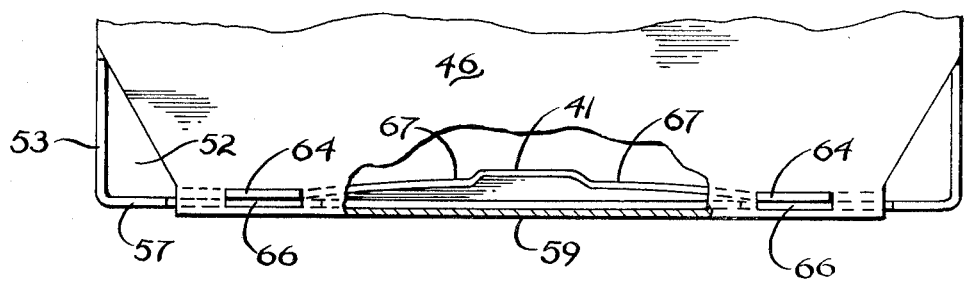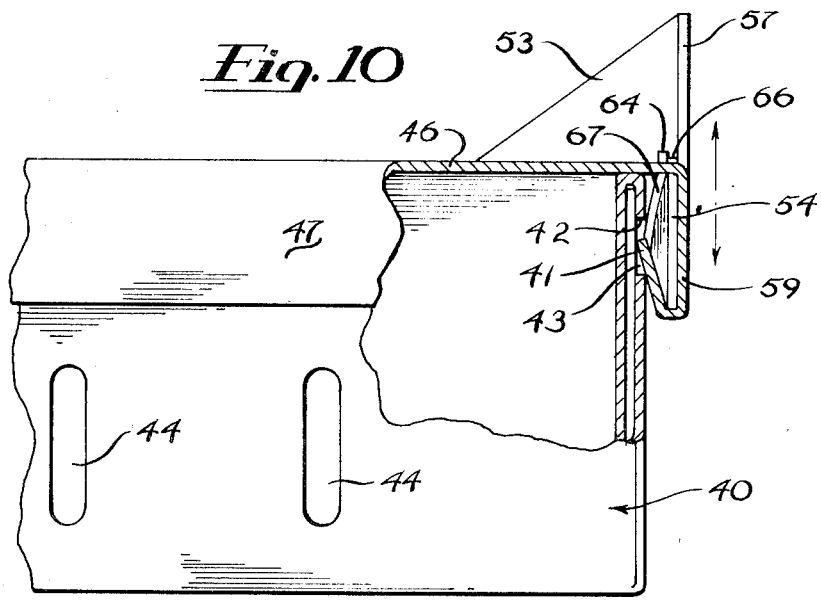

United States Patent Office 3,520,468
Patented July 14, 1970

3,520,468
CONTAINER CLOSURE STACKING ALIGNMENT AND LATCHING STRUCTURE
Ronald W. Wiemann, Claremont, Calif., assignor to Crown Zellerbach Corporation, San Francisco, Calif., a corporation of Nevada
Filed Jan. 3, 1969, Ser. No. 788,750
Int. Cl. B65d *5/22*
U.S. Cl. 229—45                 5 Claims

ABSTRACT OF THE DISCLOSURE

Corners of a container closure are each formed with an upstanding corner-forming projection comprising a pair of tabs integrally connected together and to adjacent walls of the closure; the tabs being angularly related to facilitate alignment of containers in stacked relationship and to hold them against relative lateral shifting. Means is provided to latch the lid loosely to the tray to allow movement of the lid relative to the tray.

This invention relates to a container closure having means for facilitating alignment of stacked containers and holding them against lateral shifting when so stacked, and is particularly adapted for containers which are packed with product, such as grapes.

SUMMARY AND OBJECTS OF THE INVENTION

Summarizing the invention, it comprises providing at least two corners of a container closure, such as the lid of a container which is telescoped over a container body, an upstanding corner-forming projection above the cover which comprises a pair of angularly related tabs integrally connected together with each tab extending integral from a wall of the cover at the corner. The tabs are formed by cuts from an integral blank of material. Desirably, the closure is rectangular in shape and projections are provided at all four corners. Thus, when the lid is placed over contents in a container, each lid provides a receptacle for receiving a container stacked thereon and preventing lateral shifting thereof.

The lid is provided with latching means cooperable with complementary latching means on the container, the latching means being spaced apart to allow limited movement of the lid relative to the container. Thus, when first packed with some product, such as grapes, which extend over the upper edge of the container, the lid permits such overfilling with the lid still in latched position. As vibration and stacking pressures compress the contents, the lid remains latched but as the contents compress downwardly, the lid can automatically lower while still remaining latched. The latching means is of cuch character as to enable ready unlatching of the lid when desired.

From the preceding, it is seen that the invention has as its objects, among others, the provision of an improved cover or lid structure for a container which provides for alignment of stacked containers and holding them against relative lateral shifting; is of simple and economical construction that can be formed from a single blank of material, desirably paperboard; and which is provided with means for loosely latching the lid relative to the container to enable movement of the lid relative to the container. Other objects of the invention will become apparent from the following more detailed description and accompanying drawings in which:

DESCRIPTION OF FIGURES

FIG. 1 is a plan view of a paperboard blank, desirably corrugated paperboard, for forming the lid of one embodiment of the invention;

FIG. 2 is a fragmentary isometric view of the blank of FIG. 1 in set up condition, and illustrating its relationship to a tray before being telescoped thereover;

FIG. 3 is a fragmentary horizontal section taken in a plane indicated by line 3—3 in FIG. 2;

FIG. 4 is a vertical section taken in a plane indicated by line 4—4 in FIG. 2, and illustrating schematically in phantom lines how the lid is telescoped in loose latched position over the tray;

FIG. 5 is a fragmentary isometric view of the lid telescoped over the tray;

FIG. 6 is an elevational view of the lid telescoped over the tray and illustrating in phantom lines a tray stacked thereover; a portion of the lid being broken away to illustrate a vertical section taken in the plane indicated by line 6—6 in FIG. 5;

FIG. 7 is a plan view of a modified form of blank for forming a modified lid embodying the principle of the invention;

FIG. 8 is a fragmentary isometric view of the blank of FIG. 7 in set up condition, and illustrating its relationship to a tray before being telescoped thereover;

FIG. 9 is a fragmentary plan view of the blank of FIG. 7 in set up condition with a portion broken away to illustrate its construction;

FIG. 10 is an elevational view of the lid formed from the blank of FIG. 7 telescoped over a tray; a portion being broken away to illustrate in vertical section the loose latching arrangement of the lid on the tray;

Figure 11:
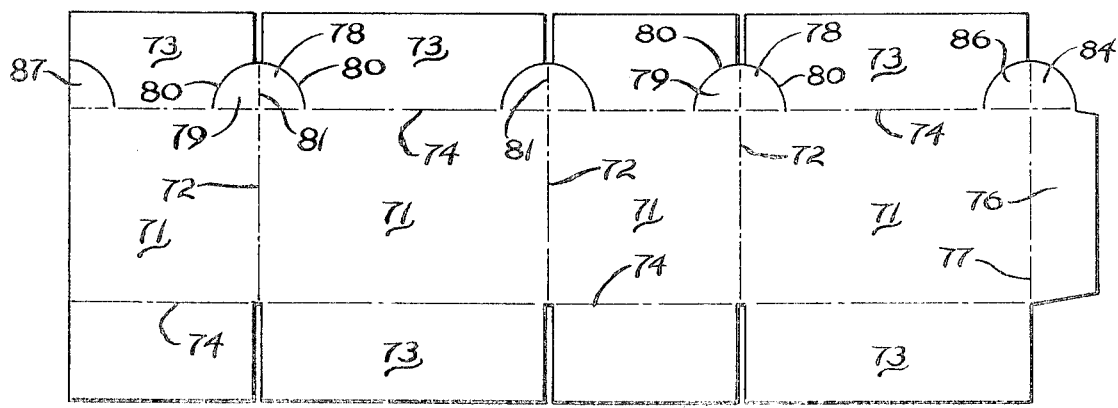
FIG. 11 is a plan view of a blank of another embodiment of the invention adapted for a regular slotted container (RSC)

The invention hereof is particularly adapted for trays in which product, such as grapes, are adapted to be packed. Referring to the embodiment illustrated in FIGS. 1 through 6 a more or less conventional grape tray (except for latching means to be described) comprises a container 2 of paperboard, desirably corrugated paperboard, having end walls 3 each formed of inner and outer panels hingedly connected together in a conventional manner, and side walls 4 also of inner and outer panels hingedly connected together. Ventilating openings 6 are provided at the bottom of side walls 4; and hand holes 7 are provided in the end walls. Adjacent each end the outer panel of each wall 3 is formed with a horizontal slit 8 connected to an outer vertical slit 9, resulting in formation of a tab 11 which can be depressed inwardly to provide an opening under slit 8 and thus form a latching edge 12 for a purpose to be described subsequently.

Adapted to close container tray 2 is a special lid cover structure having a cover panel 13 substantially rectangular in shape, and provided with upright walls connected to its edges 13', so that at each corner of the panel there are a pair of adjacent walls. The lid is adapted to telescope over the container as shown in FIG. 5.

With reference to the blank from which the lid is formed, as illustrated in FIG. 1, one pair of opposite walls, which are designated as side walls, comprises panels 14 each of which is hingedly connected along a score line 16 to rectangularly shaped cover panel 13. Score lines 16 terminate short of score lines 17 which extend transversely with respect to score lines 16. An inwardly extending arcuate cut 18 extends from the end of each score line 16 toward a score line 17, which results in each wall panel 14 being hingedly connected to cover panel 13 intermediate its ends. An end flap 19 is connected to each end of each panel 14 along a hinge connection score line 21 which extends transversely with respect to score line 16 and is substantially in line with score line 17.

Hingedly connected along each score line 17 to the cover panel 13 is another side wall panel 22 which is hingedly connected along a double score line 23 to a panel 24. Panel 24 is cut away adjacent its ends to provide end tabs 26 which are for latching purposes to be described later; and a central tab 27 projects outwardly from panel 24.

A cut out portion 28 is provided between each end of panels 22, 24 and end flap 19 to form a space; and cut out portion 28 is such as to form an integral tab 29 extending from end flap 19 and which is hingedly connected to a tab 31 extending from a panel 14 and which is formed as a result of arcuate cut 18. Tabs 29 and 31 are integrally hinged together along a score line which forms a continuation of score line 21.

In setting up the blank to form the lid, each end flap 19 is turned inwardly along hinge connection score line 21 and is held between panels 22 and 24 which are folded together along double score line 23; and tab 27 is inserted into a slot 29' along score line 17 to latch the structure. Thus, as shown in FIGS. 2 and 5, when the blank is set up, each end flap 19 provides an end portion of the double panel side wall formed by panels 24 and 22 with panel 22 being an outer panel and 24 an inner panel. Instead of a double wall panel, panel 24 may be omitted and the end flap 19 stapled to panel 22.

When all the panels are thus set up, it will be noted that each pair of tabs 29 and 31 is integrally connected at a right angle (acute angle) with respect to each other, in upstanding relationship from cover panel 13 to form a corner-forming projection at each corner of the lid. Since each tab 31 is cut out by cut 18 from a corner portion of the cover panel 13, a notch or opening 32 is formed at each corner of the lid; and with reference to FIGS. 2 and 5, it will be observed that by virtue of the cut out 28, the end of each outer panel 22 is spaced from the adjacent corner to accommodate the tab 29 which extends from end flap 19.

As a result of these upstanding corner-forming projections formed by tabs 29 and 31, when a lid is telescoped over a tray, this provides for alignment when another tray, as shown in FIG. 6, is stacked on the lid of an underlying tray; and at the same time the corner-forming projections hold stacked trays against relative lateral shifting. In this connection, it will be noted that since the corner-forming projections are on a telescoping lid, their inner surfaces will be in substantial alignment with but positioned beyond the outer walls of the tray, thus allowing stacking alignment without substantial bending of the tabs. Although, corner-forming projections are advantageously provided at all corners of the lid, they may be provided at at least a pair of diagonally opposite corners.

In the packaging of certain products, such as grapes, they are usually overfilled in the tray; and means is provided to telescope the lid over the tray in loosely latched relationship to allow the lid to ride high on the tray at the time produce is packed therein, and eventually settle down onto the tray as the product loses bulk. Such means comprises the edges of tabs 26 which are so located as to be spaced a greated distance from the top of the tray than the edges 12 of the openings formed by tabs 11. As a result, when the lid is positioned over the tray the latching edges 12, 26 provide freedom of up and down movement, while at the same time the lid remains latched. Because of such spacing of the cooperable latching edges, the lid can be readily removed when desired by pulling a loosely latched wall of the lid outwardly and tilting the lid.

Another embodiment of the invention is illustrated in FIGS. 7 through 10 but the loose latching between the lid and tray 40 is obtained by a latching tab 41 on the lid engageable with the upper edge 42 of a conventional hand hole 43 in each fo the opposite outer panels of double panel tray side walls; the tray also being of conventional construction having side wall ventilating openings 44.

The lid comprises cover panel 46, a pair of opposite side wall panels 47 hingedly connected intermediate their ends to cover panel 46 along score lines 48. Each end of each score line 48 is connected to an inwardly extending cut 49 extending toward a score line 51 which is transverse with respect to score lines 48. Each cut 51 forms a notch opening 52 from a corner of cover panel 46 to thus provide a corner tab 53 projecting from a panel 47 in the set up lid.

Each end of each wall panel 47 is hingedly connected to an end flap 54 along a transversely extending score line 56. A corner forming tab 57 extends from the end flap and is hingedly connected to an adjacent tab 53 along a score line which is a continuation of score line 56. As in the previously described embodiment, a cut out portion 58 is provided between each end flap 54 and the adjacent end of respective outer and inner side wall panels 59 and 61 which are hingedly connected together along double score line 62 with the outer panel hingedly connected to a score line 51. A cut 60 frees the inner end of each tab 57 when the lid blank is set up.

A pair of spaced apart slots 63 is formed adjacent each score line 51 to receive latching tabs 64 adjacent the outer ends of each panel 61 and latching tabs 66 extending from the inner edges of end flaps 54 when the lid is set up. When so set up, each end flap 54 is held between wall panels 59 and 61.

Each inner wall forming panel 61 has edges 67 which slant inwardly from tabs 64 to the central latching tab 41 which as previously related, in the set up lid is adapted to cooperate with the upper edge 42 of a tray hand hole 43 to latch the lid loosely when the lid is telescoped over the tray. As in the previous embodiment, the spacing between the edge of each tab 41 and hand hole edge 42 is such as to provide the loose latching which allows limited movement of the lid relative to the tray.

Figure 12:
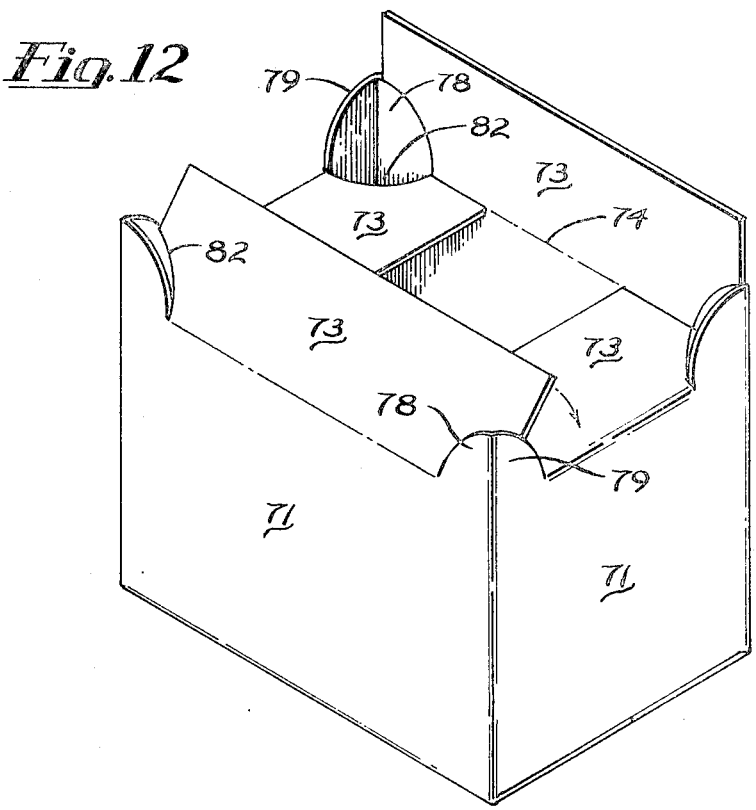
FIG. 12 is an isometric view of the blank of FIG. 11 set up with some of the cover flaps in open position to illustrate the construction.

FIGS. 11 and 12 illustrate a further embodiment of the invention applicable to a so-called regular slotted type container (R.S.C.) having side walls 71 hingedly connected together along score lines 72 and to which closure flaps 73 are hingedly connected along score lines 74. As usual in such type of container, an end flap 76 is hingedly connected to one end side wall 71 of the blank along a score line 77, and is secured by adhesive or stitching to the opposite side wall 71 of the blank when the carton is set up.

Corner-forming projections to enable the aforementioned alignment and stacking and holding of stacked containers against lateral shifting, are provided by tabs 78 and 79 cut out by arcuate cuts 80 from the closure flaps 73 hinged to one of score lines 74. Each pair of tabs intermediate the ends of the blank is hingedly connected together along a score line 81 in alignment with a score line 72, so that in the set up blank, the tabs 78, 79 form upstanding corner-forming projections leaving openings 82. In this connection, a tab 84 is formed to project from flap 76 at one end of the blank and is hingedly connected to tab 86 cut out from the corner of end closure flap 73 of the blank. At the opposite end of the blank a tab 87 is cut out from the corner of the end closure flap 73 adjacent thereto, and is secured to tab 84 in the set up container.

I claim:

1. In a removably mounted container closure lid for a container tray, a cover panel provided with a plurality of edges, a first pair of upright side walls connected to a first pair of adjacent edges of the cover panel and a second pair of upright walls connected to a second pair of adjacent edges of the cover panel; means for facilitating alignment of such containers in stacked relationship and holding them against relative lateral shifting comprising a corner forming projection upstanding above such cover panel from at least each of a pair of corners of the panel and having a pair of integrally connected tabs at a right angle with respect to each other with each tab extending from and being integral with a wall of the cover panel at such corner; said lid being telescoped over the tray and each wall of a pair of walls of the lid having tabs the upper edges of which are engageable against edge portions of openings in tray walls to latch the lid to the tray, the tab edges and said edge portions of the openings being spaced apart to provide loose latching and allow movement of the lid relative to the tray.

2. A blank for a lid for telescoping over a container and having in erected position an upstanding corner-forming projection comprising a pair of angularly related integrally connected tabs for facilitating alignment of said containers in stacked relationship and holding them against lateral shifting, comprising a cover panel, a first side wall panel hingedly connected to an edge of said cover panel intermediate its ends along a first score line, cut at a corner of said cover panel extending inwardly from an end of said first score line toward a second score line extending transversely with respect to said first score line, said second score line providing an adjacent edge of said cover panel and said cut forming one of said tabs and in the erected position of said lid forming a corner opening in such cover panel, an end flap connected to the end of said first side wall panel along a third transversely extending score line, a second side wall panel hingedly connected to said cover panel along said second score line and which with said end flap forms a second side wall of the lid, a projection extending inwardly from said end flap and hingedly connected to said one of said tabs along said third score line to form the other of said pair of tabs, and a cut out portion between said end flap and the adjacent end of said second side wall panel.

3. The lid blank of claim 2 wherein in the erected position, said second side wall panel forms an outer wall panel and is hingedly connected to another panel which forms an inner wall panel of said second side wall with said end flap therebetween.

4. The lid blank of claim 2 wherein the cover panel is of substantially rectangular shape and in the erected position such corner forming projection is provided at all four corners.

5. In a removably mounted container closure lid for telescoping over a container tray, a cover panel provided with a plurality of edges, a first pair of upright side walls connected to a first pair of adjacent edges of the cover panel and a second pair of upright walls connected to a second pair of adjacent edges of the cover panel; means for facilitating alignment of such containers in stacked relationship and holding them against relative lateral shifting comprising a corner forming projection upstanding above such cover panel from at least each of a pair of corners of the panel and having a pair of integrally connected tabs at a right angle with respect to each other with each tab extending from and being integral with a wall of the cover panel at such corner; the tabs of each corner-forming projection being connected together along a fold line with one tab extending from an end flap which is connected at the corner to one end of the walls of the lid along a fold line which is a continuation of said first mentioned fold line and which forms an end portion of an adjacent wall of said lid, the other tab being integral with said one wall of said lid and being cut out from a corner portion of said cover panel leaving a corner opening and said adjacent wall comprising a panel the end of which is spaced from said corner; the provision of said tabs on said lid when telescoped over a tray positioning said tabs beyond the walls of such tray to enable stacknig alignment of trays without substantial bending of the tabs.

References Cited

UNITED STATES PATENTS 3,410,475  11/1968  Wagner _____ 229—34

FOREIGN PATENTS 964,940  7/1964  Great Britain.

DAVID M. BOCKENEK, Primary Examiner

U.S. Cl. X.R.

206—65; 229—34

UNITED STATES PATENT OFFICE

CERTIFICATE OF CORRECTION

Patent No. 3,520,468                                         July 14, 1970

Ronald W. Wiemann

It is certified that error appears in the above identified patent and that said Letters Patent are hereby corrected as shown below:

Column 1, line 53, "cuch" should read -- such --. Column 3, line 63, "greated" should read -- greater --. Column 4, line 1, "fo" should read -- of --. Column 6, line 20, cancel "end" second occurrence; line 30, "stacknig" should read -- stacking --.

Signed and sealed this 23rd day of March 1971.

(SEAL)
Attest:

Edward M. Fletcher, Jr.                             WILLIAM E. SCHUYLER, JR.
Attesting Officer                                            Commissioner of Patents